United States Patent
Hayashi et al.

(10) Patent No.: US 7,099,246 B2
(45) Date of Patent: Aug. 29, 2006

(54) METHOD AND APPARATUS FOR RECORDING DATA ON AN OPTICAL DISC WITH RESTARTING WRITING OF DATA AFTER DATA RECORDING INTERRUPTION

(75) Inventors: Koji Hayashi, Hashima (JP); Akira Tsukihashi, Gunma-ken (JP)

(73) Assignee: Sanyo Electric Co., Ltd., Osaka (JP)

(*) Notice: Subject to any disclaimer, the term of this patent is extended or adjusted under 35 U.S.C. 154(b) by 441 days.

(21) Appl. No.: 10/066,056

(22) Filed: Jan. 31, 2002

(65) Prior Publication Data

US 2002/0101803 A1 Aug. 1, 2002

(30) Foreign Application Priority Data

Jan. 31, 2001 (JP) ............................. 2001-024081

(51) Int. Cl.
*G11B 7/0045* (2006.01)
*G06F 3/06* (2006.01)

(52) U.S. Cl. ............... 369/47.33; 710/59; 369/47.3

(58) Field of Classification Search ............. 369/47.3, 369/53.3, 47.33–47.34, 47.51, 53.4; 710/59; G11B 7/0045, 20/10, 20/24; G06F 3/06
See application file for complete search history.

(56) References Cited

U.S. PATENT DOCUMENTS

| 4,860,272 | A  | * | 8/1989 | Nishikawa et al. ...... 369/53.28 |
| 6,055,216 | A  |   | 4/2000 | Shintani |
| 6,198,707 | B1 | * | 3/2001 | Yamamoto ............... 369/47.25 |
| 6,269,059 | B1 |   | 7/2001 | Kuroda et al. |
| 6,522,608 | B1 |   | 2/2003 | Kuroda |
| 6,570,832 | B1 |   | 5/2003 | Yamamoto |
| 6,584,053 | B1 | * | 6/2003 | Tsukihashi ............... 369/53.34 |
| 6,587,416 | B1 |   | 7/2003 | Tsukihashi |
| 6,704,387 | B1 | * | 3/2004 | Lin ............................ 377/33 |
| 6,775,211 | B1 | * | 8/2004 | Tsukihashi ............... 369/47.28 |

FOREIGN PATENT DOCUMENTS

| EP | 0 507 571 | 10/1992 |
| EP | 0 974 966 | 1/2000 |
| JP | 63-52393 | 3/1988 |

(Continued)

OTHER PUBLICATIONS

Abstract for Japanese Patent No. JP1312736, Publication Date Dec. 18, 1989, Title: Optical Disk Device and Optical Disk.

(Continued)

*Primary Examiner*—A M Psitos
(74) *Attorney, Agent, or Firm*—Fish & Richardson P.C.

(57) ABSTRACT

A data recording equipment that accurately restarts the writing of data to an optical disc after data recording is interrupted. The equipment interrupts recording when detecting an external shock or when predicting the occurrence of a buffer underrun error. The equipment includes a counter, which counts execution of recording data on the optical disc and generates a count value indicating the amount of data that is recorded, and a control unit, which is connected to the counter to hold the count value of the counter immediately before an interruption when the recording of data is interrupted. The unit re-irradiates a position on the optical disc, on which data prior to the data recorded immediately before the interruption is recorded. The init controls restart of the recording based on the held count value while recognizing the position of the data on the optical disc.

20 Claims, 7 Drawing Sheets

FOREIGN PATENT DOCUMENTS

| | | |
|---|---|---|
| JP | 1-312736 | 12/1989 |
| JP | 4-103079 | 4/1992 |
| JP | 5-282696 | 10/1993 |
| JP | 408147879 A | 6/1996 |
| JP | H11-66745 | 3/1999 |
| JP | 11-259982 | 9/1999 |
| KR | 1998-028125 | 7/1998 |
| KR | 1999-024893 | 4/1999 |

OTHER PUBLICATIONS

Abstract for Japanese Patent No. JP3260958, Publication Date: Nov. 20, 1991, Title: Optical Disk Device.

Abstract for Japanese Patent No. JP6076401, Publication Date: Mar. 18, 1994, Title: Magneto-Optical Recording Method for Magneto-Optical Disk of Large Heat Time Constant, Recording Device and Magneto-Optical Disk.

Abstract for Japanese Patent No. JP6162511, Publication Date: Jun. 10, 1994, Title: Recording Method for Optical Disk Employing Draw Type Disk Recording Device.

Abstract for Japanese Patent No. JP10241165, Publication Date: Sep. 11, 1998, Title: Pulse Generating Circuit and Optical Disc Driver.

Japan registered publication No. 2842262, equivalent to above named document AG.

* cited by examiner

Recording

After Interrption

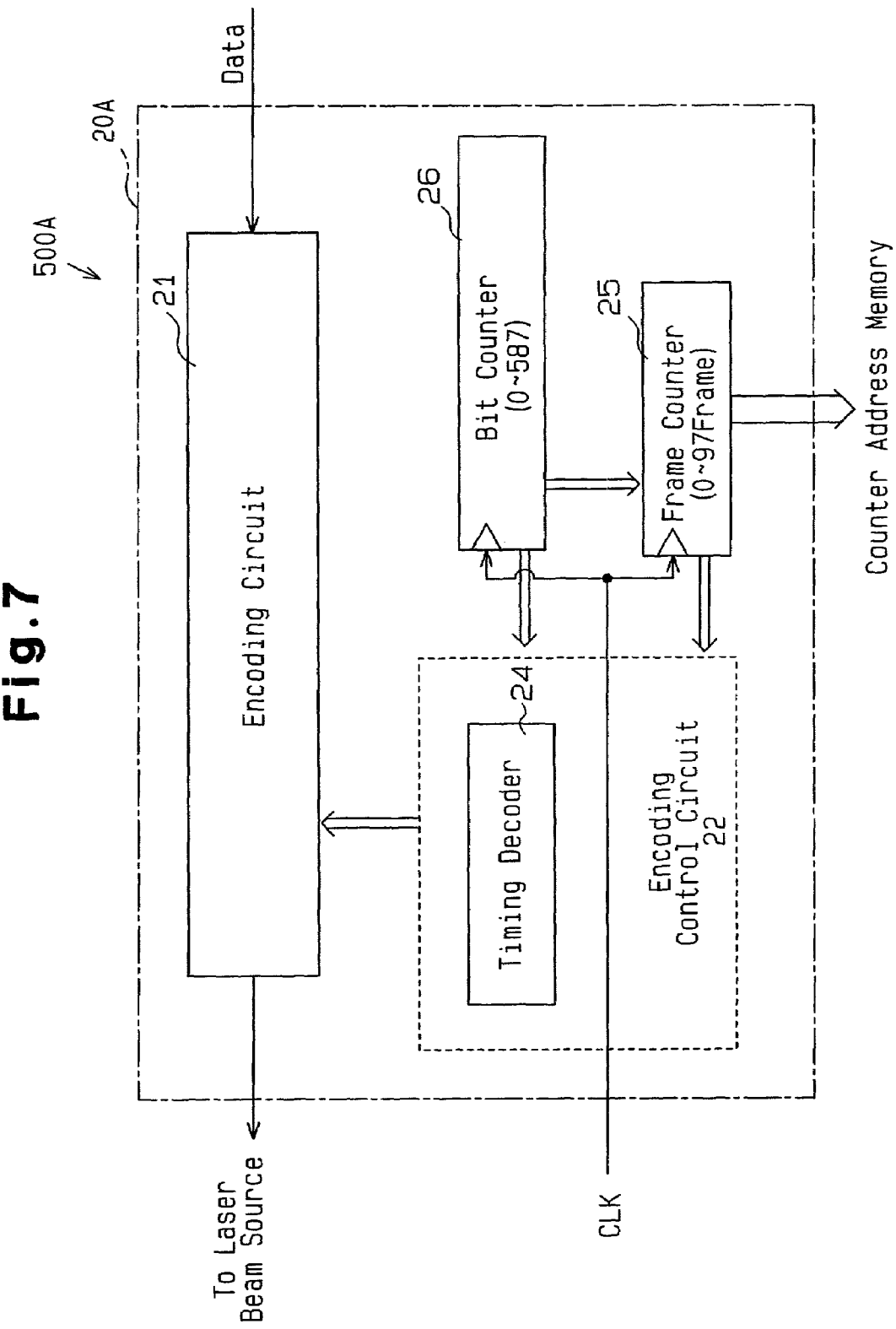

Recording

Interruption

After Interrption

METHOD AND APPARATUS FOR RECORDING DATA ON AN OPTICAL DISC WITH RESTARTING WRITING OF DATA AFTER DATA RECORDING INTERRUPTION

BACKGROUND OF THE INVENTION

The present invention relates to a data recording equipment, a controller of a data recording equipment, and a method for recording data.

An optical disc is known as a recording medium that records data. A CD-R, which is one type of optical disc, records data only once, for example, in disc units or track units. The CD-R is widely used due to its superior cost efficiency per unit of data.

A spiral pregroove, which is a guide groove, is formed in the CD-R. The pregroove wobbles in a cyclic manner. Information, such as the position on the disc (i.e., absolute time) and the respective maker's, specifications is written in correspondence with the wobbles. When data is recorded in the guide groove, an absolute time in pregroove (ATIP) address that shows the absolute time information on the optical disc is read from the pregroove. Data is then recorded while using the ATIP address to accurately ascertain the data recording position on the disc.

A recording equipment that records data on a CD-R normally includes:

an encoder for adding data position information to data input by an external device and for performing eight to fourteen (EFM) modulation;

a recording laser drive circuit for emitting a laser beam on an optical disc in accordance with the data encoded by the encoder;

a read laser drive circuit for emitting a laser beam, which is used to reproduce data, on an optical disc and reading an ATIP addresses to find the absolute time in the optical disc; and a decoder for reading an ATIP address by decoding a reflection of a laser beam.

Data is recorded on the optical disc while reading ATIP addresses from the optical disc with the read laser drive circuit and the decoder. This records the data at predetermined positions on the optical disc.

There is a possibility of a shock being applied to the data recording equipment when data is being recorded on the optical disc. This may momentarily change the disc position irradiated by the laser beam. As a result, recording positions may be skipped. When skipping occurs, a gap may be produced in the data recorded on the optical disc. In addition, the recording of data while reading ATIP addresses becomes difficult.

This problem occurs not only when a shock is applied to the data recording equipment but also when the recording of data is automatically interrupted to avoid a buffer underrun error. Further, equipments that record data on other types of optical discs, such as a compact disc-rewritable (CD-RW), and equipments that record data on a magneto-optic disc (MO) or a mini disc (MD) may have the same problem. In this specification, optical discs include magneto-optic discs unless otherwise specified.

SUMMARY OF THE INVENTION

It is an object of the present invention to provide a data recording equipment and a controller of a data recording equipment that accurately restarts the writing of data to an optical disc after a data recording interruption.

To achieve the above object, the present invention provides a data recording equipment for recording data by irradiating an optical disc with a laser beam and for interrupting the recording of data when detecting an external shock that hinders the recording of data or when predicting the occurrence of a buffer underrun error. The data recording equipment includes a counter for counting execution of recording data on the optical disc and generating a count value indicating the amount of data that is recorded. A control unit is connected to the counter to hold the count value of the counter immediately before the interruption when the recording of data is interrupted. The control unit re-irradiates a position on the optical disc, on which data prior to the data recorded immediately before the interruption is recorded, with the laser beam. The control unit controls restart of the recording of data based on the held count value while recognizing the position of data on the optical disc.

A further perspective of the present invention is a data recording controller for controlling recording of data by irradiating an optical disc with a laser beam and for controlling interruption of the recording of data when detecting an external shock that hinders the recording of data or when predicting the occurrence of a buffer underrun error. The controller includes a counter for counting execution of recording data on the optical disc and generating a count value indicating the amount of data that is recorded. The count value is generated from the counter in correspondence with a laser irradiation position when the optical disc is irradiated with the laser beam from a position on the optical disc in which data preceding the data recorded immediately before the interruption is recorded prior to restarting of the interrupted recording. A control unit is connected to the counter to hold the count value of the counter immediately before the interruption when the recording of data is interrupted. The control unit compares the count value, which is generated prior to the restart of the recording, and the count value, which is stored therein, and restarts the recording of data based on the comparison.

A further perspective of the present invention is a method for controlling recording of data by irradiating an optical disc with a laser beam and for interrupting the recording of data when detecting an external shock that hinders the recording of data or when predicting the occurrence of a buffer underrun error. The method includes generating a count value n synchronism with execution of recording data on the optical disc indicating the amount of data that is recorded using a counter, holding the count value of the counter that is generated immediately before the recording of data is interrupted, irradiating the optical disc with the laser beam from a position on the optical disc in which data preceding the data recorded immediately before the interruption is recorded, and restarting the recording based on the held count value while recognizing the position of the data in the optical disc.

Embodiment may include some of the following features.

The counter counts includes a first counter for generating a first count value by counting units of a predetermined data amount, the predetermined data amount units each being obtained by dividing a minimum unit of a disc format by a predetermined integer, the disc format including address information, wherein the first counter is initialized when the first count value reaches the minimum unit; and a second counter for generating a second count value by counting the data in bit units, wherein the second counter is initialized when the second count value becomes equal to the predetermined data amount unit of the first counter. The control unit stores at least the first counter value of the first counter. The first and second counter each perform counting prior to the restart of the recording in correspondence with the position of the optical disc re-irradiated by the laser beam. The data recording equipment further comprises an information memory device for storing a history of the initialization of the first counter when the recording is interrupted; and the control unit controls restart of the recording using at least the first count value stored therein and the first count value counted prior to the restart of recording after confirming that the history stored in the information memory device matches the position of the optical disc re-irradiated by the laser beam.

The data recording equipment further comprises a demodulation circuit for reproducing disc position information that is recorded on the optical disc from the position re-irradiated by the laser beam before the recording is restarted; and an information memory device connected to the demodulation circuit for storing the disc position information when the recording is interrupted. The counter counts includes a first counter and a second counter, wherein the first counter counts units of a predetermined data amount to generate a first count value, the predetermined data amount units each being obtained by dividing a minimum unit of a disc format by a predetermined integer. The disc format includes address information, wherein the first counter is initialized when the first count value reaches the minimum unit, wherein the second counter counts the data in bit units to generate a second count value, the second counter being initialized when the second count value becomes equal to the predetermined data amount unit of the first counter. The first and second counter each perform counting prior to the restart of the recording in relation with the position of the optical disc re-irradiated by the laser beam; and wherein the control unit controls restart of the recording using at least the first count value stored therein and the first count value counted prior to the restart of recording after detecting matching of the disc position information reproduced before the recording is restarted and the disc position information stored in the information memory device.

The controller further comprises a decoder for reading disc position information, which is recorded on the optical disc, from a reflection light of the laser beam; and a disc position information memory for storing the disc position information read from the decoder when the recording is interrupted. In this embodiment, the counter includes a first counter for generating a first count value by counting units of a predetermined data amount, the predetermined data amount units each being obtained by dividing a minimum unit of a disc format by a predetermined integer, the disc format including address information, wherein the first counter is initialized when the first count value reaches the minimum unit; and a second counter for generating a second count value by counting the data in bit units, wherein the second counter is initialized when the second count value becomes equal to the predetermined data amount unit of the first counter. The control unit stores the first counter value of the first counter and the second count value of the second counter and restarts the recording of data when the first and second count values generated prior to the restart of the recording matches the first and second count values stored therein after confirming that the disc position information read prior to the restart of the recording matches the disc information position stored in the disc position information memory.

In another embodiment, the controller further comprises an encoder connected to the control unit for encoding data and generating encoded data in synchronism of the first and second count values of the first and second counters. The encoder includes the first counter and the second counter. The encoder performs an eight-to-fourteen modulation on data and generates modulated data.

The controller further comprises a decoder for reading disc position information, which is recorded on the optical disc, from a reflection light of the laser beam; and a disc position information memory for storing the disc position information read from the decoder when the recording is interrupted. In this embodiment, the counter includes a first counter for generating a first count value by counting units of a predetermined data amount, the predetermined data amount units each being obtained by dividing a minimum unit of a disc format, the disc format including address information, wherein the first counter is initialized when the first count value reaches the minimum unit; and a second counter for generating a second count value by counting the data in bit units, wherein the second counter is initialized when the second count value becomes equal to the predetermined data amount unit of the first counter. The control unit stores the first count value of the first counter and restarts the recording of data when the first count value generated prior to the restart of the recording matches the first count value stored therein after confirming that the disc position information read prior to the restart of the recording matches the disc information position stored in the disc position information memory.

The method for controlling recording data may include one or more of the following features. The counter includes a first counter for generating a first count value by counting units of a predetermined data amount, the predetermined data amount units each being obtained by dividing a minimum unit of a disc format by a predetermined integer, the disc format including address information, wherein the first counter is initialized when the first count value reaches the minimum unit; and a second counter for generating a second count value by counting the data in bit units, wherein the second counter is initialized when the second count value becomes equal to the predetermined data amount unit of the first counter. The method further includes the steps of storing at least the first count value of the first counter and a value related with a history of initialization of the first counter in the memory; generating the first count value in correspondence with a position irradiated by the laser beam using at least the first counter prior to the restart of the recording; confirming that the value related with the history of initialization that is stored in the memory matches the position irradiated by the laser beam; and restarting the recording based on at least the first count value stored in the memory and the first count value generated prior to the restart of the recording.

In another method, the steps include storing at least the first count value of the first counter and disc position information recorded on the optical disc in the memory; reproducing the disc position information from a position irradiated by the laser beam prior to the restart of the recording; generating the first count value in correspondence with the position irradiated by the laser beam using at least the first counter prior to the restart of the recording; detecting whether the disc position information stored in the memory matches reproduced disc information; and restarting the recording based on at least the first count value stored in the memory and the first count value generated prior to the restart of the recording.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 7 is a schematic block diagram of an encoder employed in a data recording equipment according to a second embodiment of the present invention.

DETAILED DESCRIPTION OF THE PREFERRED EMBODIMENTS

Figure 1:
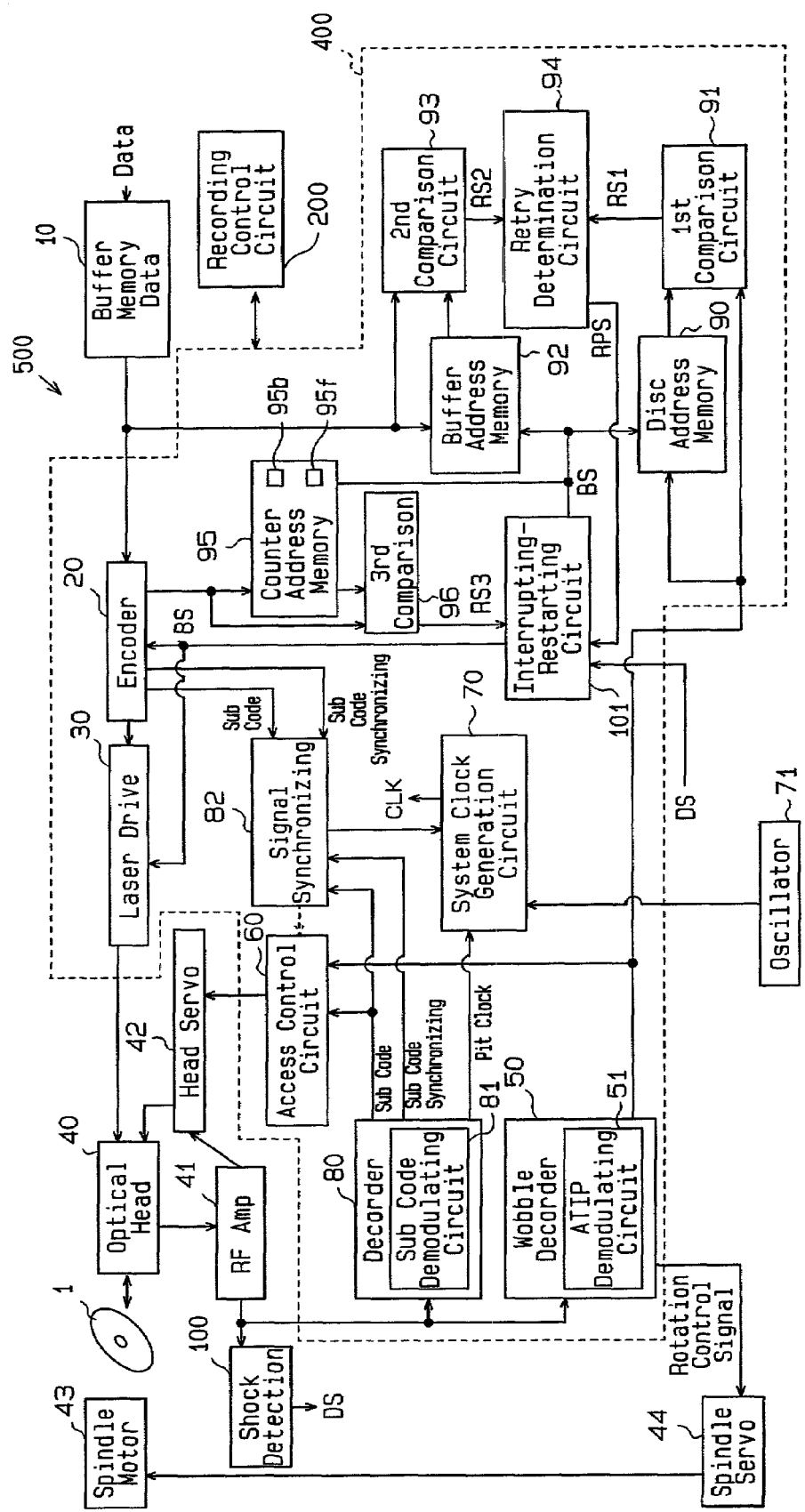
FIG. 1 is a schematic block diagram of a data recording equipment according to a first embodiment of the present invention.

In the drawings, like numerals are used for like elements throughout.

First Embodiment

FIG. 1 is a schematic block diagram of a data recording equipment 500 according to a first embodiment of the present invention. An optical disc 1, or recording medium of the data recording equipment 500, is a CD-R disc to which data is written (recorded) only once. A spiral pregroove, which functions as a guide groove, is formed in the optical disc 1.

The pregroove wobbles on the optical disc. Information, such as the absolute time (ATIP) or the specification of the disc, is written in the pregroove in correspondence with the wobbles. When data is recorded on the optical disc 1, the absolute time information is extracted, and the desired data is recorded at a predetermined position of the pregroove based on the absolute time information.

A laser beam is emitted into the guide groove (recording layer) in accordance with the recorded data. When the laser beam has a high output, the laser beam forms a recording bit. When the laser beam has a low output, the laser beam forms a land instead of a recording pit. The formation of a recording pit is indicated by binary digital data. When a laser beam having a low output to reproduce data is emitted to the recording layer, the reflectance of the laser beam differs depending on whether or not a recording pit is formed. Data recorded on the recording layer is reproduced in accordance with the reflectance.

Figures 2A, 2B:
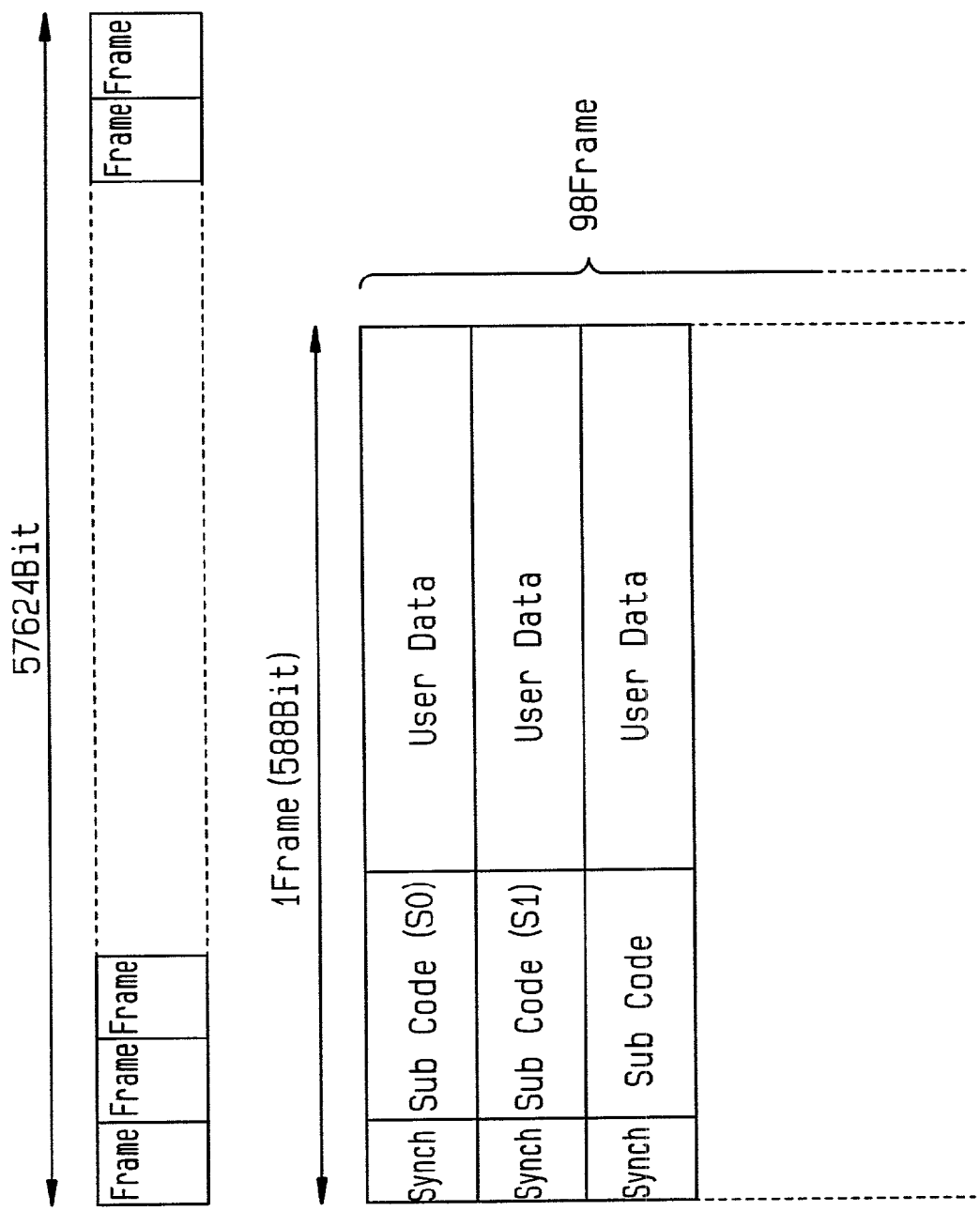
FIGS. 2A and 2B are diagrams showing the form of data encoded by the data recording equipment of FIG. 1.

More specifically, data (sector data) having the same format as a compact disc-read only memory (CD-ROM) is recorded on the optical disc 1. Referring to FIG. 2A, a sector of data includes 57,624 bits of data. A synchronizing signal, or the like, is added to the recorded data. Further, the recorded data undergoes an EFM process or a Cross-Interleaved Reed=Solomon Code (CIRC) process. The sector includes 98 frames.

Referring to FIG. 2B, a single frame has 588 bits of data and includes a synch pattern and a sub-code in addition to the recorded data (user data) The sub-code has 14 bits of data. The sub-codes of the first two frames include sub-code synchronizing signals S0, S1, respectively. Among the 98 frames, the sub-codes of 80 frames include P, Q, R, S, T, U, V, and W channel data. Among the channel data, the Q channel data includes time information of a sector on a track.

Data, which has the format of FIGS. 2A and 2B, is recorded on the recording layer by emitting a laser beam. When the recorded data is reproduced, data is read in the same manner as when the data of a CD-ROM is reproduced. More specifically, the data recording equipment 500 decodes the sub-codes to acquire the time information of data on the optical disc while reading data.

The data recording equipment 500, which records data based on recording data from an external device will now be discussed.

The data recording equipment 500 includes a buffer memory 10, an encoder 20 for reading data from the buffer memory 10 and encoding the data, a laser drive circuit 30 for generating a drive signal corresponding to the encoded data, and an optical head for emitting a laser beam to the optical disc 1 in accordance with the drive signal.

Figure 3:
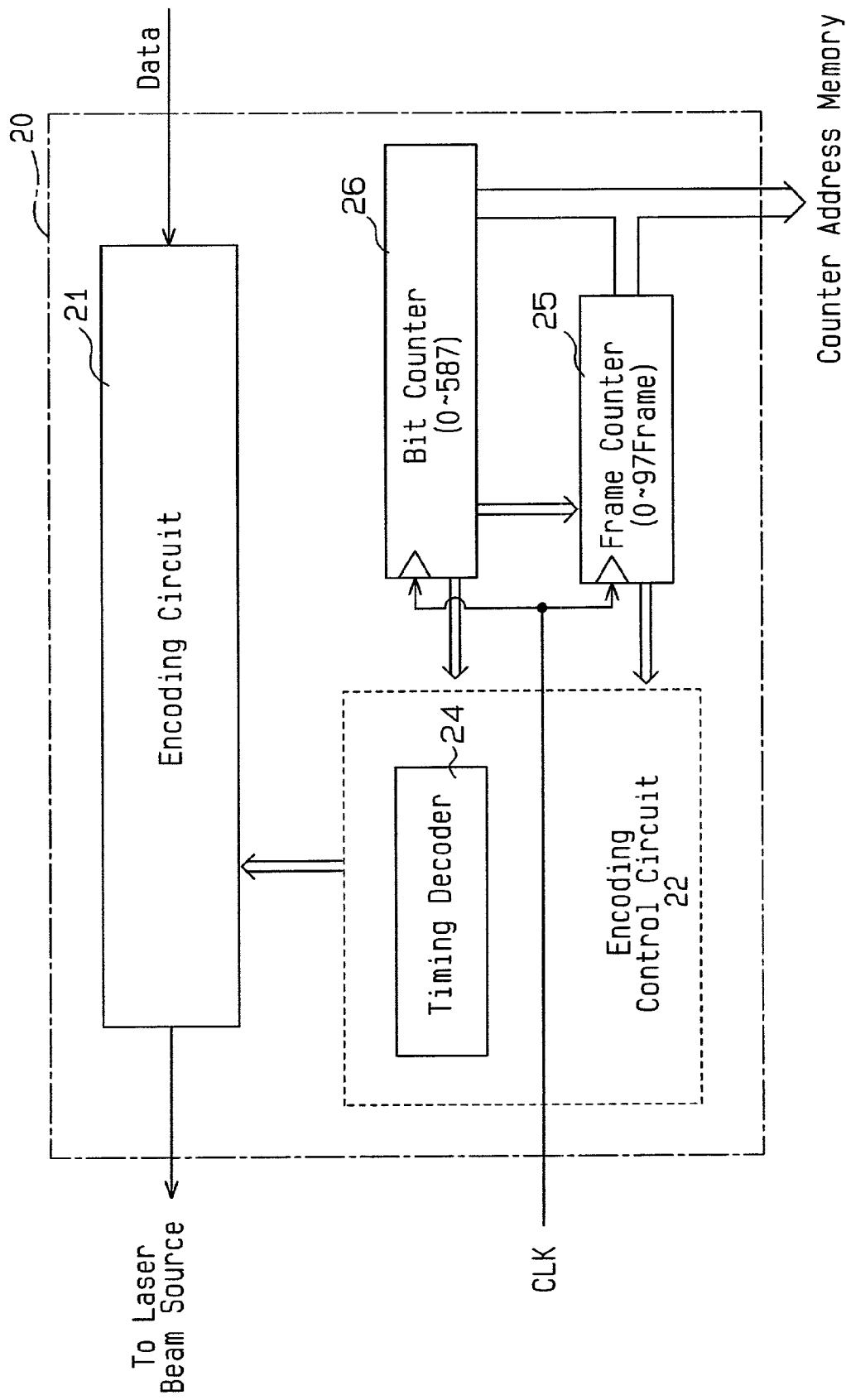
FIG. 3 is a schematic block diagram of an encoder employed in the data recording equipment of FIG. 1.

The buffer memory 10 includes, for example, an SDRAM, which is a ring buffer. The encoder 20 sequentially reads data from the buffer memory 10 and encodes the data into sectors of data having the format of FIGS. 2A and 2B. Referring to FIG. 3, the encoder 20 includes an encoding circuit 21, which encodes the read data.

The encoder 20 also has an encoding control circuit 22, which controls the encoding performed by the encoding circuit 21. The encoding control circuit 22 controls encoding based on count values of a frame counter 25 and a bit counter 26.

The frame counter 25 and the bit counter 26 perform counting in synchronism with a clock CLK. The frame counter 25 is used to determine the frame of each sector in which the data provided to the laser drive circuit 30 is allocated. The bit counter 26 is used to determine the bit of each frame in which the data provided to the laser drive circuit 30 is allocated.

A timing decoder 24 sends commands to the encoding circuit 21 to generate encoded data based on the counters 25, 26.

Figure 4:
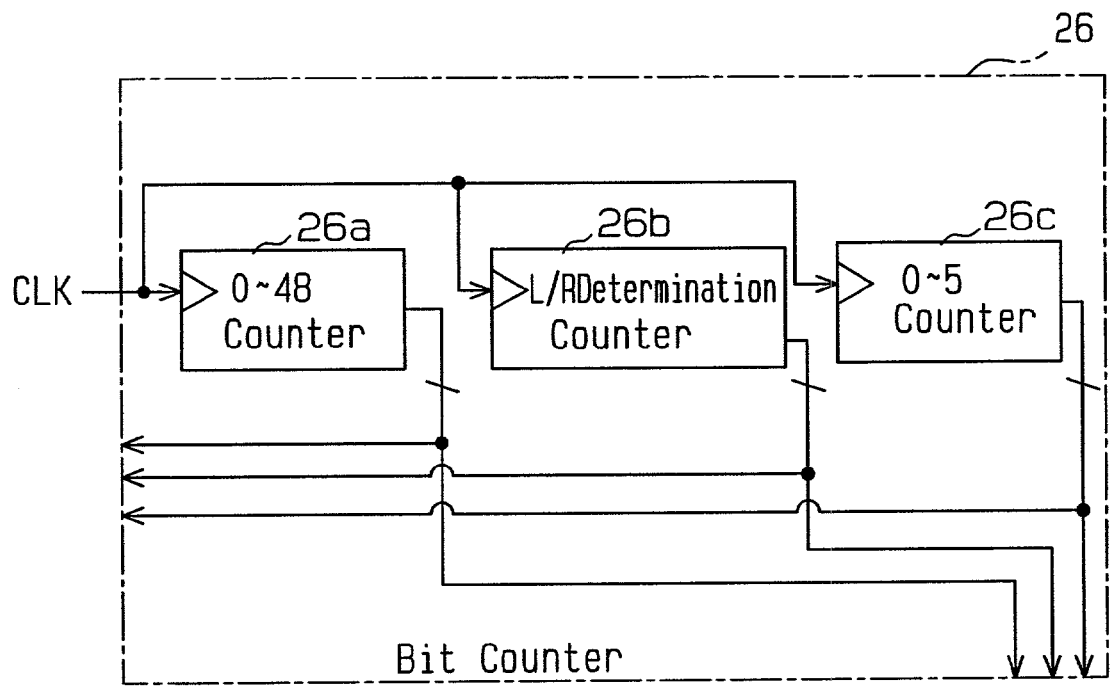
FIG. 4 is a schematic block diagram of a bit counter employed in the encoder of FIG. 3.

Referring to FIG. 4, the bit counter 26 includes a 0–48 counter 26a, a L/R determination counter 26b, and a 0–5 counter 26c. The encoding circuit 21 processes data based on the counters 26a, 26b, 26c.

The data encoded by the encoder 20 is provided to the laser drive circuit 30 in data units of one bit. Based on each piece of data, the laser drive circuit 30 generates a high output drive signal, which forms a recording pit on the recording layer of the optical disc 1, or a low output drive signal to form a land on the recording layer. Further, the laser drive circuit 30 generates a reproduction drive signal to read data from the pregroove. Based on the drive signal, the optical head 40 records data by emitting a laser beam having an output corresponding to the recorded data.

A servo system of the data recording equipment 500 used to emit a laser beam to a desired position on the optical disc 1 will now be discussed.

The servo system includes the optical head 40, which emits a laser beam to the optical disc 1 and receives the reflection of the laser beam, an RF amp 41 for generating binary digital data after amplifying the laser beam reflection, and a head servo 42 for controlling the optical head 40 based on the digital data of the RF amp 41.

Figure 5:
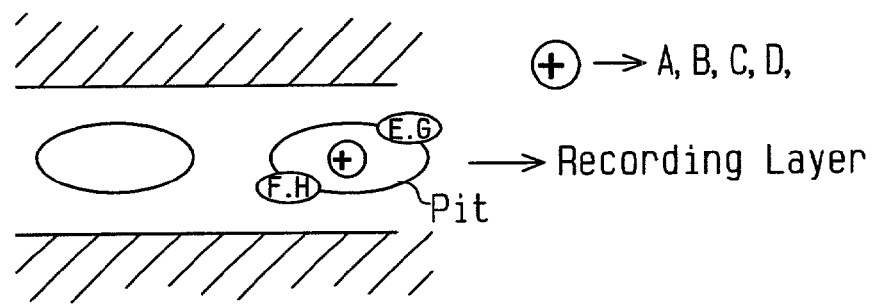
FIG. 5 is a schematic diagram illustrating a laser beam received by an optical head employed in the data recording equipment of FIG. 1.

The optical head 40 includes a recording laser beam source, which selectively emits a high output laser beam and a low output laser beam on the recording layer of the optical disc 1 in accordance with the recording data, and two reproduction laser beam sources for emitting a lower output laser beam on each side of the recording layer. The optical head 40 further includes eight light receiving elements (A, B, C, D, E, F, G, H), which receive laser beam reflections from the optical disc 1, as shown in FIG. 5. The light receiving elements A–D receive the reflections of the laser beam emitted to the recording layer by the recording laser beam source. The light receiving elements E, G receive reflections of the laser beam of one of the reproduction laser beams. The light receiving elements F, H receive reflections of the laser beam of the other reproduction laser beam. The light receiving elements E, F receive laser beam reflections from both sides of the recording layer. Wobble components are detected from the wobbled pregroove based on the reflection light receives by the light receiving elements E, F. The ATIP information is read from the detected wobble components.

The RF amp 41 amplifies the reflection light (signal) received by the light receiving elements of the optical head 40 and converts the signal to binary digital data. The head servo 42 receives the digital data from the RF amp 41. The head servo 42 performs focusing control, which focuses the laser beam on the recording layer of the optical disc 1 based on the digital signal, tracking control, which follows the track of the optical disc 1 with the laser beam, and sled feed control, which moves the optical head 40 in the radial direction of the optical disc 1.

The servo system further includes a spindle motor 43, which rotates the optical disc 1, and a spindle servo 44, which controls the spindle motor 43 so that the optical disc 1 rotates at a constant linear velocity.

The data recording equipment 500 extracts data from the wobbles of the pregroove to control the rotating speed of the optical disc 1 at a constant linear velocity. Referring to FIG. 1, the data recording equipment 500 includes a wobble decoder 50 to extract data from the wobbles.

The wobble decoder 50 decodes a binary wobble signal, which was generated by the RF amp 41 based on the reflection light of the reproduction laser beam. The decoding is performed by extracting a basic wave component, which has a frequency of 22.05 Hz at a standard rotating speed, and data from the wobble signal. Based on the wobble speed, the wobble decoder 50 generates a rotating control signal so that the optical disc 1 is rotated by the spindle motor 43 at a constant linear velocity. Based on the rotation control signal, the spindle servo 44 controls the spindle motor 43 so that the optical disc 1 rotates at a constant linear velocity.

The wobble decoder 50 includes an ATIP demodulating circuit 51. The ATIP demodulating circuit 51 generates absolute time information (ATIP addresses) based on the wobble components. Accordingly, the data recording equipment 500 refers to the ATIP addresses to synchronize data in sector units by recording data to the optical disc 1.

An access control circuit 60 refers to the ATIP addresses when necessary. The access control circuit 60 controls the head servo 42 based on the ATIP addresses and controls access to the optical disc 1.

The data recording equipment 500 controls the rotation of the optical disc 1 at a constant linear velocity and records data at desired positions based on the ATIP addresses of the pregroove by using the pregroove formed in the optical disc 1 when recording data.

The data recording equipment 500 performs data recording operations based on the clock CLK generated by a system clock generation circuit 70. The system clock generation circuit 70 generates the system clock at different timings when recording data and when reproducing data. During the recording of data, the system clock CLK is generated based on pulse signals generated by an oscillator 71.

In the first embodiment, when it is determined that there is a possibility of the occurrence of skipping, the recording of data is automatically interrupted. After the recording of data is interrupted, the recording of data is restarted from the data following the data recorded immediately before the interruption. More specifically, the address of the recording data when an interruption occurs is held. When the recording restarts, the position on the optical disc 1 to which the laser beam is emitted is moved back by a distance corresponding to a predetermined amount of data. The laser beam is then emitted to the optical disc at a position on which data has already been recorded. In other words, the data recorded on the disc 1 is traced. The tracing reads the position information of data recorded on the optical disc 1. Thus, the data recording equipment 500 restarts data recording when the position irradiated by the laser beam reaches the position in which data was recorded immediately before the interruption.

More specifically, when performing the tracing, the data recording equipment 500 reads the synchronizing signals of the sub codes from the data recorded on the optical disc 1 and synchronizes the operation of the encoder with the synchronizing signal of the read sub codes. Then, the recording equipment 500 reads the Q channel data from the data recorded on the optical disc and restarts the transfer of data from the buffer memory 10 to the encoder 20. The recording equipment 500 synchronizes the Q-channel data with the data provided to the laser drive circuit 30 from the encoder 20.

When the transfer of data from the buffer memory 10 to the encoder is restarted during the tracing period, the data transferred goes back by a predetermined amount in accordance with the tracing. During the tracing period, the address of the data transferred immediately before the interruption is matched with the address of the data transferred from the buffer memory 10 to the encoder 20 when the data recording starts. To match the addresses, the address of the data transferred from the buffer memory 10 immediately before the interruption is held.

During the tracing period, a pit clock is generated from the reflection light of the low output reproduction laser beam to synchronize the synchronizing signals of the sub signals or the Q channel data. A reproduction clock is generated based on the pit clock. The reproduction clock is used as a system clock CLK. The system clock CLK is provided to, for example, the encoder 20 and the laser drive circuit 30.

Subsequent to the tracing, the recording of data is restarted when the positing to which the laser beam is emitted reaches the position corresponding to the data recorded immediately before the interruption. The counter value of the encoder 20 and the ATIP addresses are used in the first embodiment as the address of the data corresponding to the laser beam output from the optical head 40 immediately before the interruption. In other words, after aligning the sector units of the data format using the ATIP address, the bit units are aligned using the counter value of the encoder 20. When the address of the data provided to the laser drive circuit 30 from the encoder 20 matches the data held during the interruption, the drive circuit 30 generates a drive signal corresponding to the data of the next address. Thus, the recording of data to the optical disc 1 is restarted in a continuous manner.

The recording interruption control and recording restart control performed by the data recording equipment 500 will now be discussed.

The data recording equipment 500 includes a decoder 80 and a signal synchronizing circuit 82 to synchronize the sub code of each sector data recorded on the optical disc 1 and the sub code of each sector data provided from the decoder 80.

The decoder 80 decodes the digital data provided from the RF amp 41. More specifically, the decoder 80 extracts the pit clock from the digital data and separates the sub code. The decoder 80 extracts the synchronizing signal (S0 and S1, indicated as sub code synchronizing in FIG. 1) of the sub code. The pit clock is provided to the system clock generation circuit 70.

The decoder 80 includes a sub code demodulating circuit 81. The sub code demodulating circuit 81 decodes the Q channel data (indicated as sub code in FIG. 1) from sub codes.

The signal synchronizing circuit 82 synchronizes the synchronizing signal of the sub code of the decoder 80 with the synchronizing signal of the sub code of the encoder 20. Further, the signal synchronizing circuit 82 associates the Q channel data decided by the sub code demodulating circuit 81 with the Q channel data of the encoder 20.

Further, the signal synchronizing circuit 82 controls the switching of the system clock generation circuit 70. The system clock generation circuit 70 generates the system clock CLK based on the reference clock and the reproduction clock CLK. More specifically, the system clock generation circuit 70 generates the system clock CLK based on the reproduction clock from the pit clock.

The data recording equipment 500 includes a memory for storing each data address when the recording of data is interrupted and a comparison circuit for comparing each newly acquired data address with the address stored in the memory.

More specifically, the data recording equipment 500 includes a disc address memory (disc position information memory) 90 and a first comparison circuit 91. The disc address memory 90 stores the ATIP address provided from the ATIP demodulating circuit 51. During the tracing, the first comparison circuit 91 compares the ATIP address provided from the ATIP demodulating circuit 51 with the ATIP address stored in the disc address memory 90. When the addresses match, the first comparison circuit generates the first reproduction signal RS1. The first comparison circuit 91 matches the sector unit of the data recorded to the optical disc 1 before the interruption and the position of the optical disc 1 in which the laser beam is emitted when preparing the restart of data recording.

The data recording equipment 500 includes a buffer address memory 92 and a second comparison circuit 93. The buffer address memory 92 stores the address in the buffer memory 10 of the data read from the buffer memory 10 when recording is interrupted. During the tracing, the second comparison circuit 93 compares the address of the data newly read from the buffer memory 10 with the address stored in the buffer address memory 92. The second comparison circuit 93 generates the second restart signal RS2 when the addresses match. The second comparison circuit 93 synchronizes the sector unit of the data recorded on the optical disc 1 before the interruption with the sector unit of the data provided to the laser drive circuit 30 when preparing the restart of data recording.

The data recording equipment 500 further includes a retry determination circuit 94. The retry determination circuit 94 acquires restart signals RS1, RS2 of the first and second of the first and second comparison circuits 91, 93 and generates a determination signal for retrying the tracing when the first and second comparison circuits 91, 93 do not simultaneously generate the restart signals.

In relation with the address of the data provided to the laser drive circuit 30 from the encoder 20, the data recording equipment 500 includes a counter address memory 95 and a third comparison circuit 96. The counter address memory 95 stores the values of the frame counter 25 and the bit counter 26 of FIG. 3, which are arranged in the encoder 20. More specifically, the counter memory 95 includes an address memory 95*f* for storing the value of the frame counter 25 and an address memory 95*b* for storing the value of the bit counter 26.

The third comparison circuit 96 compares the counted values of the counters 25 and 26 with the value stored in the counter address memory 95 when the sector units are synchronized. The third comparison circuit 96 generates a third restart signal RS3 when the values match. Accordingly, after the first comparison circuit 91 and the second comparison circuit 93 synchronizes sector units, the third comparison circuit 96 synchronizes the bit units of the data recorded before the interruption and the data provided to the laser drive circuit 30.

Further, the data recording equipment 500 includes a shock detection circuit 100 for generating a shock detection signal when a shock is applied and an interrupting-restarting circuit 101 for interrupting recording based on the shock detection signal.

The shock detection circuit 100 generates a shock detection signal when the position on the optical disc 1 irradiated by the laser beam is significantly displaced and the shock detection circuit 100 thus determines that a shock has been applied. The shock detection circuit 100 determines the position to which the laser beam is emitted from, for example, the reflection of the laser beam.

When receiving the shock detection signal, the interrupting-restarting circuit 101 stops the operations of the encoder 20 and the laser drive circuit 30. This stops recording data. In addition to interrupting recording, the interrupting-restarting circuit 101 generates a signal for storing the ATIP address in the disc address memory 90 when the recording is interrupted. During a recording interruption, the interrupting-restarting circuit 101 generates a signal for storing the address of the buffer memory 10 in the buffer address memory 92 and a signal for storing the address of the encoder 20 in the counter address memory 95.

When restarting data recording, the interrupting-restarting circuit 101 performs the control described below if the retry determination circuit 94 determines that the address when data recording is interrupted (hereafter, referred to as interruption address) and the new address resulting from the tracing are simultaneously synchronized.

The interrupting-restarting circuit 101 performs a control that permits the third comparison circuit 96 to output the comparison result of the data address provided to the laser drive circuit 30 from the encoder 20 and the interruption address held by the counter address memory 95. When receiving from the third comparison circuit 96 a comparison result indicating that the data address and the interruption address are matched, the interrupting-restarting circuit 101 controls the laser drive circuit 30 to generate a drive signal corresponding to the data provided to the laser drive circuit 30 from the encoder 20. Further, in this state, the interrupting-restarting circuit 101 switches the system clock CLK generated by the system clock generation circuit 70 to the reference clock. This restarts the recording of data from the piece of data following the data recorded to the optical disc 1 immediately before the interruption so that data is recorded in a continuous manner.

The data recording equipment 500 further includes a recording control circuit 200. The recording control circuit 200 controls the recording, interrupting, and restarting operations based on commands sent from a personal computer (not shown).

As shown in the broken lines of FIG. 1, the data recording equipment 500 includes a data recording controller 400. The data recording controller 400 includes a control unit, the encoder 20, the laser drive circuit 30, the wobble decoder 50, the access control circuit 60, the system clock generation circuit 70, the decoder 80, the signal synchronizing circuit 82, and the address memories 90. The control unit includes the address memories 92, 95, the first to third comparison circuits 91, 93, 96, the retry determination circuit 94, and the interrupting-restarting circuit 101. In the first embodiment, the data recording controller 400 is incorporated in a single chip integrated circuit (IC). The recording control circuit 200 is externally connected to the IC and communicates data with the IC.

The restart of the recording operation of the data recording equipment 500 will now be discussed.

When the data recording equipment 500 receives a command for performing recording from the personal computer (not shown), the recording control circuit 200 generates a control signal for recording data. Based on the control signal, the signal synchronizing circuit 82 switches the system clock CLK to the reference clock.

Figure 6A:
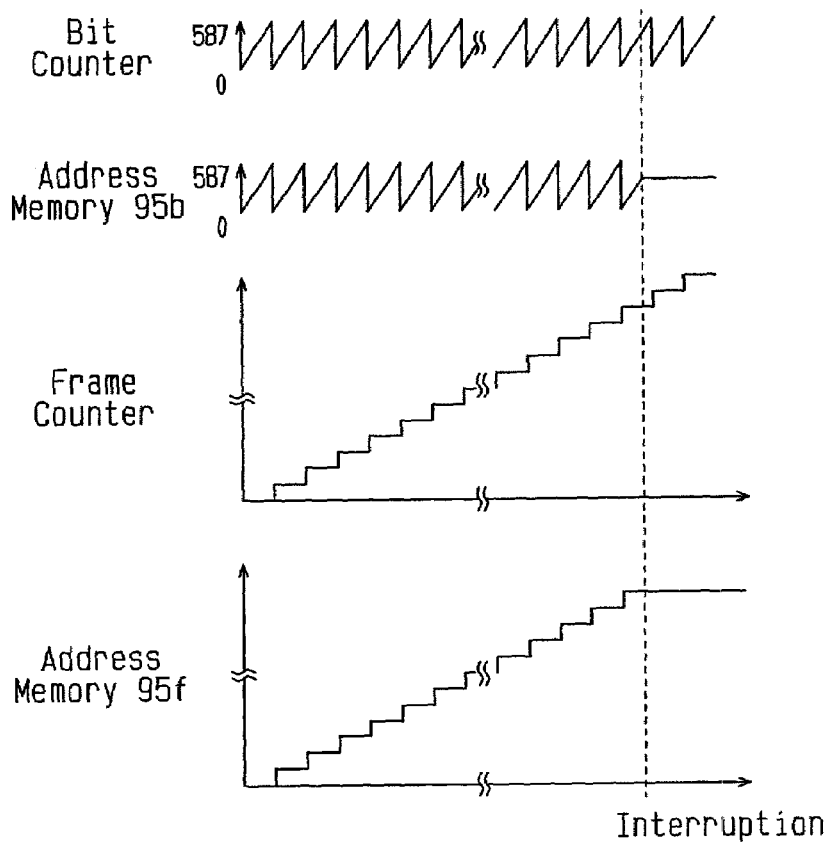
FIGS. 6A and 6B are time charts illustrating the reproduction of recorded data in the first embodiment.

The data provided to the buffer memory 10 is temporarily stored and then transferred to the encoder 20. In the encoder 20, the bit counter 26 and the frame counter 25 perform counting (refer to FIG. 6A) based on the system clock CLK provided from the system clock generation circuit 70. The data transferred from the buffer memory 10 is encoded based on the value of each counter. With reference to FIG. 6A, the value of the frame counter 25 is stored in the address memory 95f, and the value of the bit counter 26 is stored in the address memory 95b.

The data encoded by the encoder 20 is provided to the laser drive circuit 30 bit by bit. The laser drive circuit 30 generates a drive signal based on the data. Based on the drive signal, the optical head 40 emits the laser beam to the optical disc 1.

During the recording, when a shock is applied to the data recording equipment 500, the shock detection circuit 100 generates a shock detection signal DS and sends the shock detection signal DS to the interrupting-restarting circuit 101. Based on the shock detection signal DS, the interrupting-restarting circuit 101 generates the interruption signal BS and provides the interruption signal BS to the address memories 90, 92, 95, the encoder 20, and the laser drive circuit 30.

The address memories 90, 92, 95 hold the input addresses when receiving the interruption signal BS. The buffer address memory 92 holds the address in the buffer memory 10 of the final piece of data read from the buffer memory 10. The disc address memory 90 holds the final ATIP address received from the ATIP demodulating circuit 51. The address memory 95f of the counter address memory 95 holds the count value of the frame counter 95f. The address memory 95b holds the count value of the bit counter 26.

Based on the interruption signal BS, the encoder 20 stops providing data to the laser drive circuit 30, and the laser drive circuit 30 stops generating the recording drive signal. Accordingly, the optical head 40 stops emitting the laser beam to the optical disc 1, and the data recording equipment 500 interrupts the recording of data.

After the data recording equipment 500 interrupts data recording, when the data recording equipment 500 receives a recording restart command from the personal computer, the data recording equipment 500 provides the recording control circuit 200 with the recording restart command. In response to the recording restart command, the data recording equipment 500 performs tracing to restart data recording.

Based on the control of the access control circuit 60, the head servo 42 controls the optical head 40. Based on the control of the head servo 42, the optical head 40 emits a laser beam to a position corresponding to an address that goes back by a predetermined amount from the position (absolute time) irradiated by the laser beam immediately before the interruption.

In this state, the reproduction laser beam source emits a laser beam, and the recording-reproducing laser beam source emits a laser beam having a low output. Based on the control of the interrupting-restarting circuit 101, the laser drive circuit 30 generates a drive signal having a constant low voltage. In response to the low voltage drive signal, the data recorded to the optical disc 1 is reproduced.

The RF amp 41 receives the reproduced data via the optical head 40 and converts the reproduced data to digital data. The decoder 80 decodes the digital data and extracts the pit clock, the synchronizing signal of the sub code, and the Q channel data. The system clock generation circuit 70 is provided with the pit clock.

When data recording is restarted, the system clock generation circuit 70 receives a command from the signal synchronizing circuit 82 that instructs the use of the reproduction clock as the system clock CLK. Thus, the system clock generation circuit 70 generates the reproduction clock based on the pit clock.

The sub code synchronizing signal extracted by the decoder 80 is provided to the signal synchronizing circuit 82. The signal synchronizing circuit 82 synchronizes the extracted sub code synchronizing signal of the decoder 80 with the sub code synchronizing signal of the encoder 20. In other words, the signal synchronizing circuit 82 synchronies the operation of the encoder 20 with the sub code synchronizing signal of the data recorded on the optical disc 1.

The encoder 20 then restarts the reading of data stored in the buffer memory from a predetermined address. The predetermined address is obtained by going back by a predetermined number of sectors of data from the address in the buffer memory 10 of the data transferred from the buffer memory 10 when the recording is interrupted. The encoder 20 encodes the data that is read again.

The signal synchronizing circuit 82 synchronizes the Q channel data of the encoded data with the Q channel data of the data read by the decoder 80. As a result, the Q channel data recorded on the optical disc 1 and read during tracing matches the Q channel data output from the encoder 20 to the laser drive circuit 30.

The first comparison circuit 91 compares the address decoded by the ATIP demodulating circuit 51 with the ATIP address held by the disc address memory 90. When the decoding address and the held address match, the first comparison circuit 91 generates a first restart signal RS1 and provides the retry determination circuit 94 with the first restart signal RS1.

The second comparison circuit 93 compares the address transferred from the buffer memory 10 to the encoder 20 with the address held by the counter address memory 95. When the transferred address and the held address match, the second comparison circuit 93 generates the second restart signal RS2 and provides the second restart signal RS2 to the retry determination circuit 94.

When the retry determination circuit 94 does not receive the first restart signal RS1 and the second restart signal RS2, the retry determination circuit 94 provides the recording control circuit 200 with a signal for retrying the synchronization.

When the retry determination circuit 94 receives the first restart signal RS1 and the second restart signal RS2, the retry determination circuit 94 generates a restart permission signal RPS and provides the interrupting-restarting circuit 101 with the restart permission signal RPS. In response to the restart permission signal RPS, the interrupting-restarting circuit 101 permits the output of the third comparison circuit 96. In this state, the reproduction low output laser beam output from the optical head 40 irradiates the head of the sector to which the data recorded immediately before the interruption belongs.

Figure 6B:
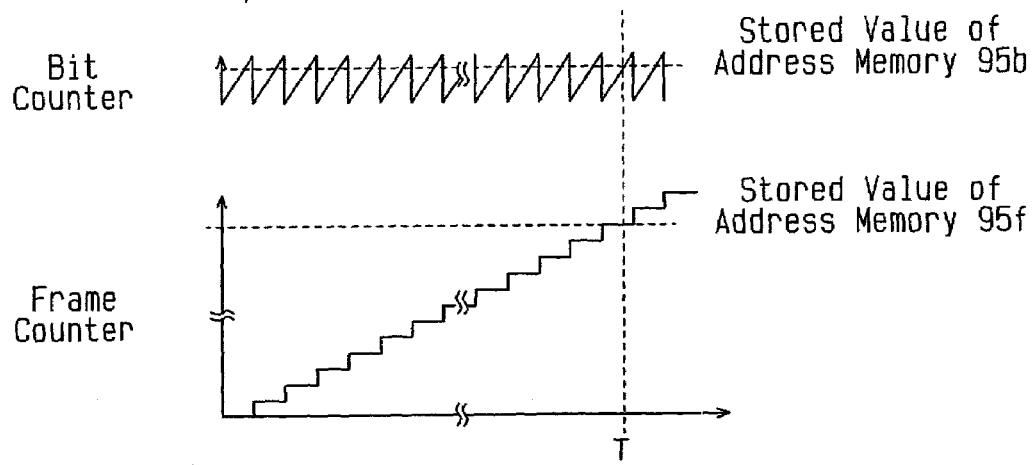

Referring to FIG. 6B, the third comparison circuit 96 compares the addresses held by the address memory 95f and the address memory 95b of the counter address memory 95 with the count values of the frame counter 25 and the bit counter 26. In FIG. 6B, at time T, the count values of the frame counter 25 and the bit counter 26 respectively corresponds to the addresses held by the address memory 95a and the address memory 95b. In this state, the third comparison circuit 96 generates the third restart signal RS3 and provides the interrupting-restarting circuit 101 with the third restart signal RS3. In response to the third restart signal RS3, the interrupting-restarting circuit 101 controls the laser drive circuit 30 to output a laser beam corresponding to the data following the data of the address held by the counter address memory 95. Thus, the recording of data to the optical disc 1 is restarted so that the interrupted data and the following data are continuous.

The data recording equipment 500 of the first embodiment has the advantages discussed below.

(1) When the interrupting-restarting circuit 101 interrupts the recording of data to the optical disc 1, the frame counter 25 and the bit counter 26 of the encoder 20 holds the address of the data recorded immediately before the interruption and the disc address memory 90 holds the ATIP address on the optical disc 1 immediately before the interruption. The first comparison circuit 91 compares the held address ATIP address and the new address obtained through tracing to detect the matching of the held address and the new address. Thus, sector units are matched when the recording of data is restarted. Further, with regard to the counter values of the encoder 20, the third comparison circuit 96 compares the held value and the value newly obtained during the tracing period to optimally restart data recording in bit units after the interruption.

(2) When the retry determination circuit 94 does not simultaneously receive the first restart signal RS1 and the second restart signal RS2, the retry determination circuit 94 generates a signal for retrying the synchronization. This avoids restart errors and restarts data recording subsequent to an interruption more optimally.

Second Embodiment

FIG. 7 is a schematic block diagram of an encoder 20A of a data recording equipment 500A according to a second embodiment of the present invention. The data recording equipment 500A differs from the data recording equipment 500 of the first embodiment only in the encoder.

The data recording equipment of the second embodiment restarts the recording of data from the head of the frame to which the data recorded when an interruption occurred belongs. That is, the data recording equipment 500A restarts the recording of data to the optical disc from the sync pattern located at the head of a frame (FIG. 2B). The data recording equipment 500A is meritorious in that it easily synchronizes data when restarting recording since the recording is restarted from the head of a frame.

The data recording equipment 500A is applied to a data recording equipment of a CD-RW. The CD-RW records new data while deleting the data recorded on the optical disc 1.

In the data recording equipment 500A, only the count value of the frame counter 25 in the encoder 20A is provided to the counter address memory 95. When recording is interrupted, the counter address memory 95 holds the count value of the frame counter 25. When recording is restarted after the interruption, the data recording equipment 500A restarts recording when the address of the interrupted frame matches the address of the frame counter 25, which is counted by the encoder 20. As a result, recording is restarted from the head of the frame that was recorded when the interruption occurred.

Figure 8A:
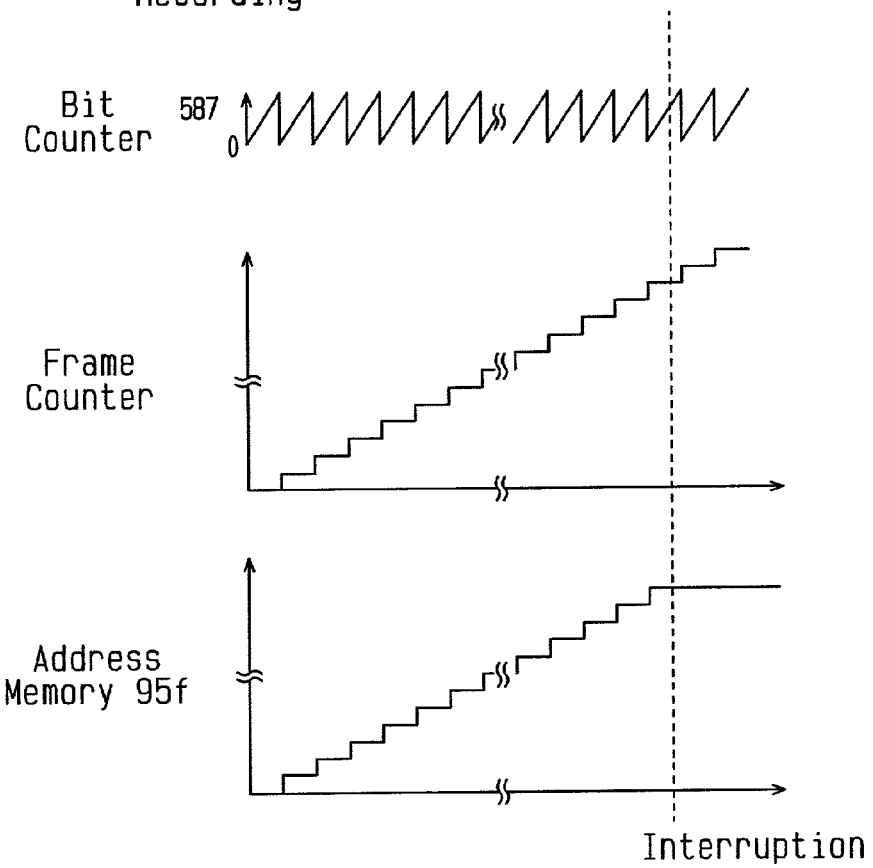
FIGS. 8A and 8B are time charts illustrating the reproduction of recorded data in the second embodiment.
Figure 8B:
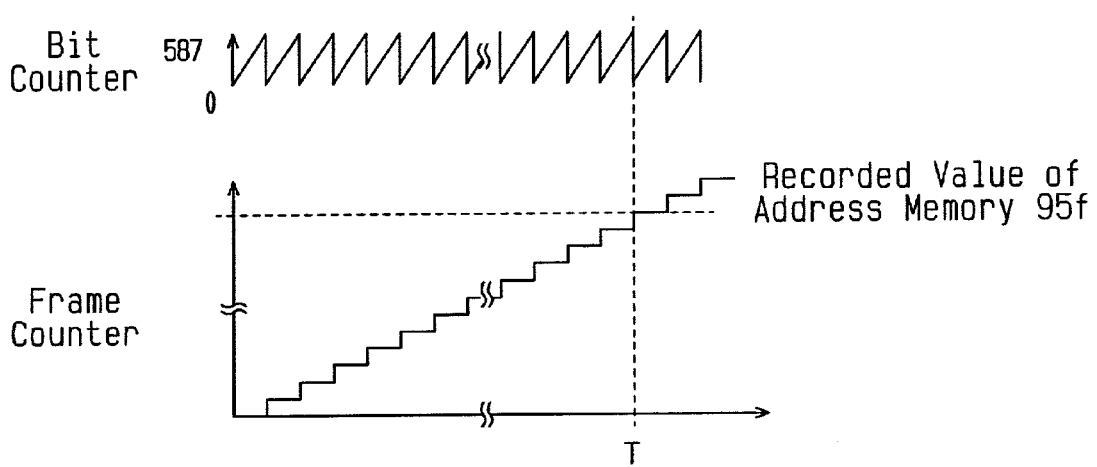

The restart of recording in the data recording equipment 500A will now be discussed. FIGS. 8A and 8B are time charts illustrating the restart of recording in the data recording equipment 500A.

Based on the counting performed by the frame counter 25 and the bit counter 26, the data recording equipment 500A encodes data and provides the encoded data to the laser drive circuit 30. In this state, the count value of the frame counter 25 is provided to the address memory 95f.

The shock detection circuit 100 generates the shock detection signal DS when the data recording equipment detects a shock that is applied to the data recording equipment 500A. Then, the shock detection circuit 100 provides the shock detection signal DS to the interrupting-restarting circuit 101. The interrupting-restarting circuit 101 generates the interruption signal BS based on the shock detection signal DS and provides the interruption signal BS to the address memories 90, 92, 95, the encoder 20, and the laser drive circuit 30 (refer to FIG. 1).

The address memories 90, 92, 95 each hold the provided address when receiving the interruption signal BS. The counter address memory 95 holds the count value of the frame counter reference of FIG. 7 (refer to FIG. 8A).

The encoder 20 stops providing data to the laser drive circuit 30 based on the interruption signal BS. The laser drive circuit 30 interrupts the generation of a recording drive signal based on the interruption signal BS. Thus, the emission of the laser beam to the optical disc 1 is stopped and recording is interrupted.

When the recording is restarted, the laser beam is emitted to a position corresponding to an address that goes back by a predetermined amount from a position on the optical disc (absolute time) at which the laser beam was emitted immediately before the interruption. The optical head 40 emits a laser beam having a low output from the recording-reproducing laser beam source and reproduces the data recorded on the optical disc 1. The signal synchronizing circuit 82 synchronizes the sub code of the reproduced data with the sub code of the data provided to the laser drive circuit 30 from the encoder 20.

When the retry determination circuit 94 simultaneously receives the first restart signal RS1 and the second restart signal RS2 from the first and second comparison circuits 91, 93, the retry determination circuit generates the restart permission signal RPS and provides the restart permission signal RPS to the interrupting-restarting circuit 101. The interrupting-restarting circuit 101 permits the output of the third comparison circuit 96 based on the restart permission signal RPS. In this state, the reproduction low output laser beam output from the optical head 40 irradiates the head of the sector to which data was recorded immediately before the interruption.

Referring to FIG. 8B, the third comparison circuit 96 compares the address held by the address memory 95f of the counter address memory 95 and the count value of the frame counter 25. At time T in FIG. 8B, the count value of the frame counter 25 matches the address held by the address memory 95f. In this state, the third comparison circuit 96 generates the third restart signal RS3 and provides the third restart signal RS3 to the interrupting-restarting circuit 101. In response to the third restart signal RS3, the interrupting-restarting circuit 101 restarts the recording of data from the head (more accurately, the data of the second bit from the head) of the frame having he address held by the address memory 95f.

In addition to the advantages of the first embodiment, the data recording equipment 500A of the second embodiment has the advantages discussed below.

(3) The recording of data is restarted from the head of the frame where the recording of data was interrupted. Thus, the timing for restarting recording is easily obtained.

It should be apparent to those skilled in the art that the present invention may be embodied in many other specific forms without departing from the spirit or scope of the invention. Particularly, it should be understood that the present invention may be embodied in the following forms.

The data recording equipment 500A of the second embodiment may be applied to a CD-R recording equipment.

In the second embodiment, when recording is interrupted, the counter address memory 95 may hold a value obtained by subtracting a value of 1 from the count value of the frame counter 25, and the count value of the bit counter 26 may be held as 586. In this case, during the tracing period, after sector units are synchronized, the count values of the frame counter 25 and the bit counter 26 are compared with the held value. If recording is restarted when the count values and the held value match, recording restarts from the head (first bit) of the frame. Further, when the counter address memory 95 receives an address (count value) from the frame counter 25 and the bit counter 26, the address may be delayed by one bit.

The shock detection circuit 100 may generate the detection signal DS using an acceleration sensor or a vibration detecting sensor.

After the retry determination circuit 94 generates the restart permission signal RPS and immediately before recording is restarted, the signal synchronizing circuit 82 may further compare the data address generated by the encoder 20 and the data address provided from the decoder 80. If the two addresses do not match, an earlier process may be restarted again.

That is, if the disc has a deficiency or if the servo is not stable when data is recorded, a disturbance may occur in the generation of pit clocks. In this state, a difference may occur between the pit clock and the data recorded on the disc. Accordingly, the comparison of the address data in the encoder 20 and the address data generated by the decoder 80 immediately before recording is restarted prevents the restart of recording when a disturbance occurs in the generation of pit clocks.

The retry determination circuit 94 may be eliminated. In this case, for example, the recording of data is restarted in response to the first and second restart signals RS1, RS2 from the first comparison circuit 91 and the second comparison circuit 93.

When sector units, which are related with the position irradiated by the laser beam on the optical disc, are sufficiently synchronized by matching the held interruption ATIP address and the ATIP address obtained during the tracing period, the buffer address memory 92 and the second comparison circuit 93 may be eliminated. In this case, recording is restarted in response to only the ATIP address.

Instead of synchronizing the data recorded on the optical disc 1 during the tracing period with the data processed by the encoder 20, the ATIP address read during tracing may be synchronized with the data processed by the encoder 20.

Instead of holding the interruption ATIP address, the history of initialization of the count value of the frame counter 25 may be held. In this case, recording is accurately restarted using the counters 25, 26 of the encoder 20 after confirming the matching of the count value of the counter during tracing and the held initialization history.

When the recording is interrupted, the W channel data encoded by the encoder 20 and the counter value of the encoder 20 may be held. In this case, recording may be restarted using the counters 25, 26 in the encoder 20 after confirming that the Q-channel data obtained by the decoder 80 during the tracing period matches the held Q channel data.

The optical disc may be controlled to rotate at a constant angular velocity. In this case, for example, a clock synchronized with wobbles is used as a data recording system clock.

The application of the present invention is effective when recording is temporarily interrupted to avoid a buffer underrun error.

The data recording equipment of the present invention may be applied to any kind of optical disc.

Even if a data recording equipment does not have the encoder 20, which encodes data input from an external circuit, the data recording equipment may be provided with a counter that is synchronized with a laser beam output in correspondence with data to store the address of the interrupted data and restart the recording of data based on the address.

The present examples and embodiments are to be considered as illustrative and not restrictive, and the invention is not to be limited to the details given herein, but may be modified within the scope and equivalence of the appended claims.

What is claimed is:

1. A data recording equipment for recording data including sub-code data by irradiating an optical disc with a laser beam and for interrupting the recording of data when detecting an external shock that hinders the recording of data or when predicting the occurrence of a buffer underrun error, the data recording equipment comprising:

a counter for counting execution of recording data on the optical disc in units of bits and generating a count value indicating the amount of data that is recorded; and a control unit connected to the counter for holding the count value of the counter immediately before the interruption when the recording of data is interrupted and re-irradiating a position on the optical disc, on which data prior to the data recorded immediately before the interruption is recorded, with the laser beam;

wherein the control unit controls restart of the recording of data based on the held count value while recognizing the position of data on the optical disc using the sub-code data.

2. The data recording equipment according to claim 1, wherein the counter counts includes:

a first counter for generating a first count value by counting the data in units of a predetermined data amount, the predetermined data amount units each being set to a minimum unit of a disc format, the disc format including address information, wherein the first counter is initialized when the first count value reaches the minimum unit; and a second counter for generating a second count value by counting the data in bit units, wherein the second counter is initialized when the second count value becomes equal to the predetermined data amount unit of the first counter;

wherein the control unit stores at least the first counter value of the first counter;

wherein the first and second counter each perform counting prior to the restart of the recording in correspondence with the position of the optical disc re-irradiated by the laser beam, the data recording equipment further comprising:

an information memory device for storing a history of the initialization of the first counter when the recording is interrupted; and wherein the control unit controls restart of the recording using at least the first count value stored therein and the first count value counted prior to the restart of recording after confirming that the history stored in the information memory device matches the position of the optical disc re-irradiated by the laser beam.

3. The data recording equipment according to claim 1, further comprising:

a demodulation circuit for reproducing disc position information that is recorded on the optical disc from the position re-irradiated by the laser beam before the recording is restarted; and an information memory device connected to the demodulation circuit for storing the disc position information when the recording is interrupted;

wherein the counter counts includes a first counter and a second counter, wherein the first counter counts the data in units of a predetermined data amount to generate a first count value, the predetermined data amount units each being set to a minimum unit of a disc format, the disc format including address information, wherein the first counter is initialized when the first count value reaches the minimum unit, wherein the second counter counts the data in bit units to generate a second count value, the second counter being initialized when the second count value becomes equal to the predetermined data amount unit of the first counter;

wherein the first and second counter each perform counting prior to the restart of the recording in relation with the position of the optical disc re-irradiated by the laser beam; and wherein the control unit controls restart of the recording using at least the first count value stored therein and the first count value counted prior to the restart of recording after detecting matching of the disc position information reproduced before the recording is restarted and the disc position information stored in the information memory device.

4. The data recording equipment according to claim 1, wherein the data recording equipment restarts the recording from the data which recording was interrupted.

5. The data recording equipment according to claim 1, further comprising:

an encoder for encoding data provided from an external device, wherein the encoder performs encoding based on the count value of the counter.

6. The data recording equipment according to claim 5, further comprising:

a buffer memory connected to the encoder for holding the data provided from the external device;

wherein the control unit holds an address in the buffer memory of the data provided to the encoder from the buffer memory immediately before the interruption and permits the restart of recording if the held address and an address of the data provided to the encoder match when data preceding the data stored therein during an interruption is provided to the encoder from the buffer memory before the recording is restarted.

7. The data recording equipment according to claim 6, wherein the encoder performs an eight-to-fourteen modulation on data and generates modulated data.

8. The data recoding equipment according to claim 7, wherein the data recording equipment restarts the recording from a head of a frame in which the recording of data was interrupted.

9. A data recording controller for controlling recording of data including sub-code data by irradiating an optical disc with a laser beam and for controlling interruption of the recording of data when detecting an external shock that hinders the recording of data or when predicting the occurrence of a buffer underrun error, the controller comprising:

a counter for counting execution of recording data on the optical disc in units of bits and generating a count value indicating the amount of data that is recorded, wherein the count value is generated from the counter in correspondence with a laser irradiation position when the optical disc is irradiated with the laser beam from a position on the optical disc in which data preceding the data recorded immediately before the interruption is recorded prior to restarting of the interrupted recording;

a control unit connected to the counter for holding the count value of the counter immediately before the interruption when the recording of data is interrupted and for comparing the count value, which is generated prior to the restart of the recording, and the count value, which is stored therein, and for restarting the recording of data based on the comparison while recognizing the position of data on the optical disc using the sub-code data.

10. The controller according to claim 9, further comprising:

a decoder for reading disc position information, which is recorded on the optical disc, from a reflection light of the laser beam; and a disc position information memory for storing the disc position information read from the decoder when the recording is interrupted;

wherein the counter includes:

a first counter for generating a first count value by counting the data in units of a predetermined data amount, the predetermined data amount units each being set to a minimum unit of a disc format, the disc format including address information, wherein the first counter is initialized when the first count value reaches the minimum unit; and a second counter for generating a second count value by counting the data in bit units, wherein the second counter is initialized when the second count value becomes equal to the predetermined data amount unit of the first counter;

wherein the control unit stores the first counter value of the first counter and the second count value of the second counter and restarts the recording of data when the first and second count values generated prior to the restart of the recording matches the first and second count values stored therein after confirming that the disc position information read prior to the restart of the recording matches the disc information position stored in the disc position information memory.

11. The controller according to claim 10, further comprising:

an encoder connected to the control unit for encoding data and generating encoded data in synchronism of the first and second count values of the first and second counters.

12. The controller according to claim 11, wherein the encoder includes the first counter and the second counter.

13. The controller according to claim 12, wherein the encoder performs an eight-to-fourteen modulation on data and generates modulated data.

14. The controller according to claim 9, further comprising:

a decoder for reading disc position information, which is recorded on the optical disc, from a reflection light of the laser beam; and a disc position information memory for storing the disc position information read from the decoder when the recording is interrupted;

wherein the counter includes:

a first counter for generating a first count value by counting the data in units of a predetermined data amount, the predetermined data amount units each being set to a minimum unit of a disc format, the disc format including address information, wherein the first counter is initialized when the first count value reaches the minimum unit; and a second counter for generating a second count value by counting the data in bit units, wherein the second counter is initialized when the second count value becomes equal to the predetermined data amount unit of the first counter;

wherein the control unit stores the first count value of the first counter and restarts the recording of data when the first count value generated prior to the restart of the recording matches the first count value stored therein after confirming that the disc position information read prior to the restart of the recording matches the disc information position stored in the disc position information memory.

15. The controller according to claim 14, further comprising:

an encoder connected to the control unit for encoding data and generating encoded data in synchronism of the first and second count values of the first and second counters.

16. The controller according to claim 15, wherein the encoder includes the first counter and the second counter.

17. The controller according to claim 16, wherein the encoder performs an eight-to-fourteen modulation on data and generates modulated data.

18. A method for controlling recording of data including sub-code data by irradiating an optical disc with a laser beam and for interrupting the recording of data when detecting an external shock that hinders the recording of data or when predicting the occurrence of a buffer underrun error, the method comprising the steps of:

generating a count value in synchronism with execution of recording data on the optical disc by counting the data in units of bits, the count value indicating the amount of data that is recorded using a counter;

holding the count value of the counter that is generated immediately before the recording of data is interrupted;

irradiating the optical disc with the laser beam from a position on the optical disc in which data preceding the data recorded immediately before the interruption is recorded; and restarting the recording based on the held count value while recognizing the position of the data in the optical disc using the sub-code data.

19. The method according to claim 18, wherein the counter includes:

a first counter for generating a first count value by counting the data in units of a predetermined data amount, the predetermined data amount units each being set to a minimum unit of a disc format, the disc format including address information, wherein the first counter is initialized when the first count value reaches the minimum unit; and a second counter for generating a second count value by counting the data in bit units, wherein the second counter is initialized when the second count value becomes equal to the predetermined data amount unit of the first counter;

the method further comprising the steps of:

storing at least the first count value of the first counter and a value related with a history of initialization of the first counter in the memory;

generating the first count value in correspondence with a position irradiated by the laser beam using at least the first counter prior to the restart of the recording;

confirming that the value related with the history of initialization that is stored in the memory matches the position irradiated by the laser beam; and restarting the recording based on at least the first count value stored in the memory and the first count value generated prior to the restart of the recording.

20. The method according to claim 18, wherein the counter includes:

a first counter for generating a first count value by counting the data in units of a predetermined data amount, the predetermined data amount units each being set to a minimum unit of a disc format, the disc format including address information, wherein the first counter is initialized when the first count value reaches the minimum unit; and a second counter for generating a second count value by counting the data in bit units, wherein the second counter is initialized when the second count value becomes equal to the predetermined data amount unit of the first counter;

the method further comprising the steps of:

storing at least the first count value of the first counter and disc position information recorded on the optical disc in the memory;

reproducing the disc position information from a position irradiated by the laser beam prior to the restart of the recording;

generating the first count value in correspondence with the position irradiated by the laser beam using at least the first counter prior to the restart of the recording;

detecting whether the disc position information stored in the memory matches reproduced disc information; and restarting the recording based on at least the first count value stored in the memory and the first count value generated prior to the restart of the recording.

* * * * *